Patented June 22, 1937

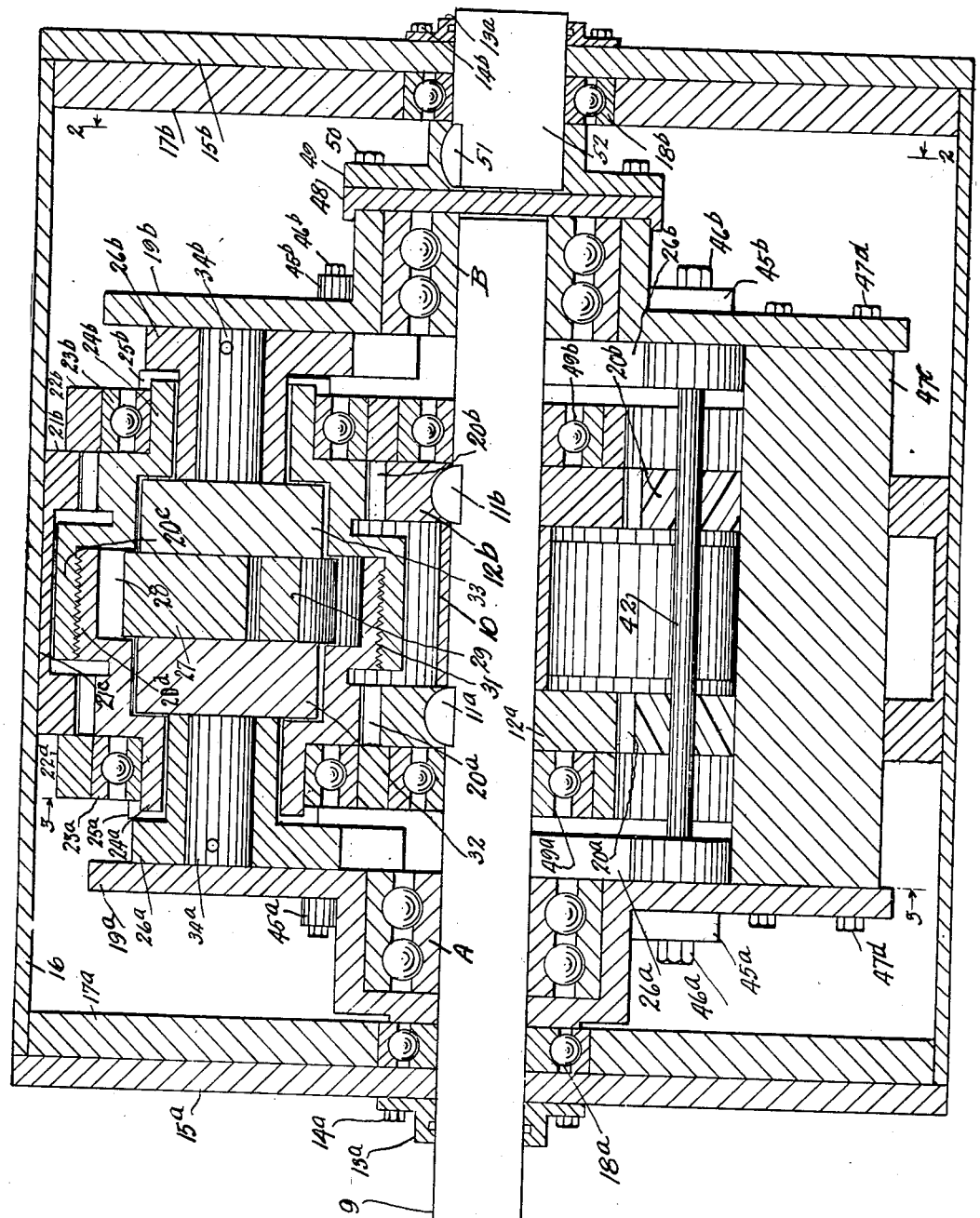

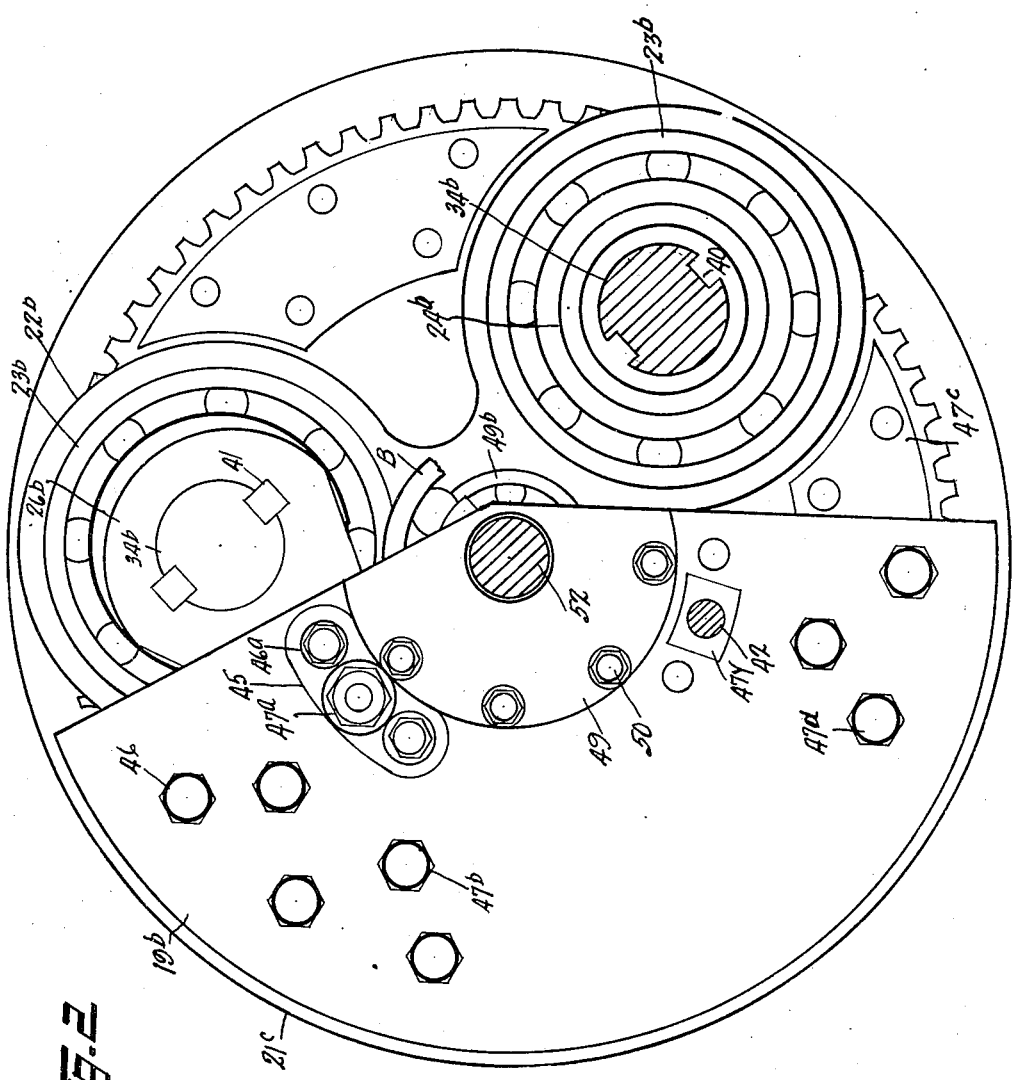

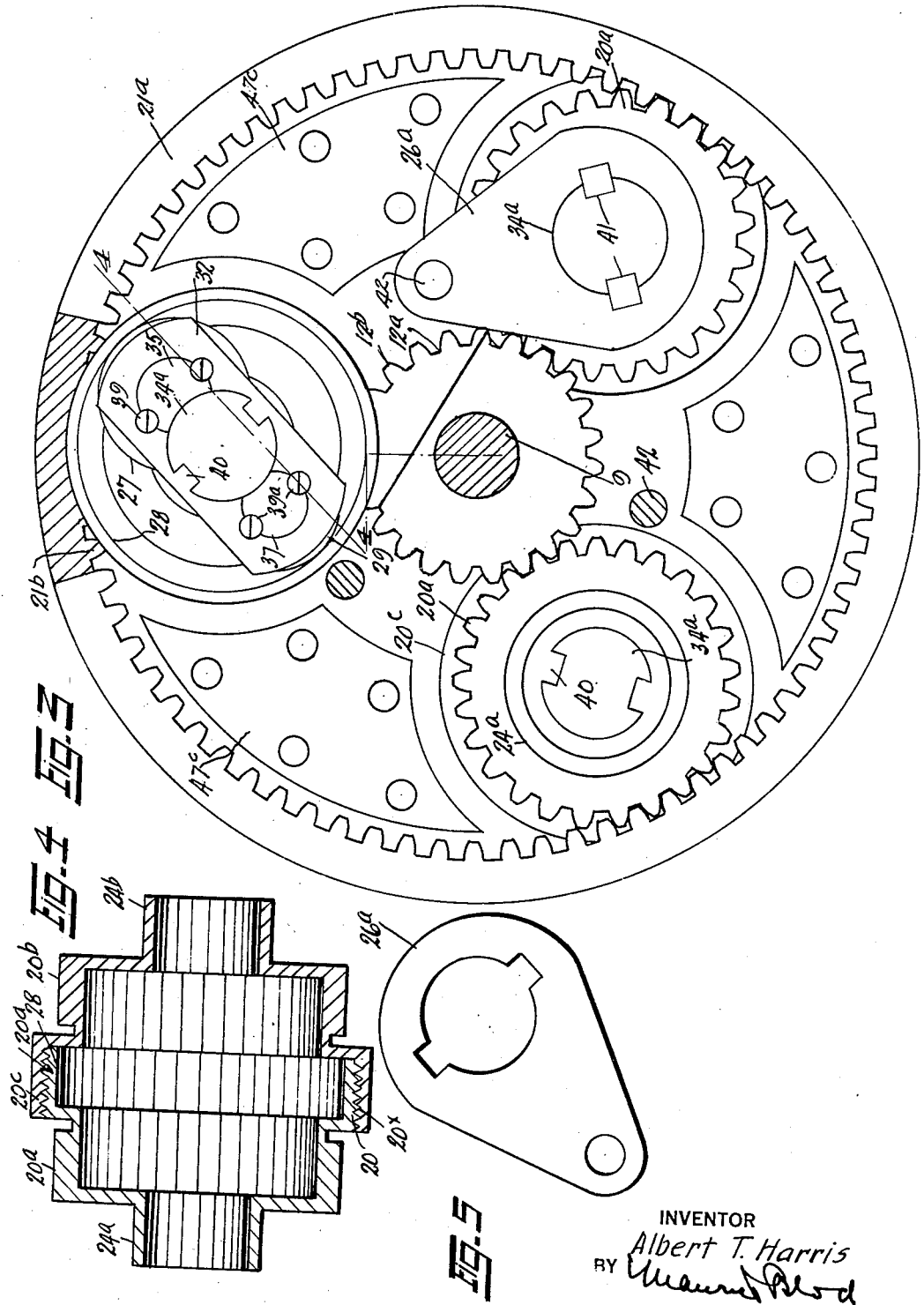

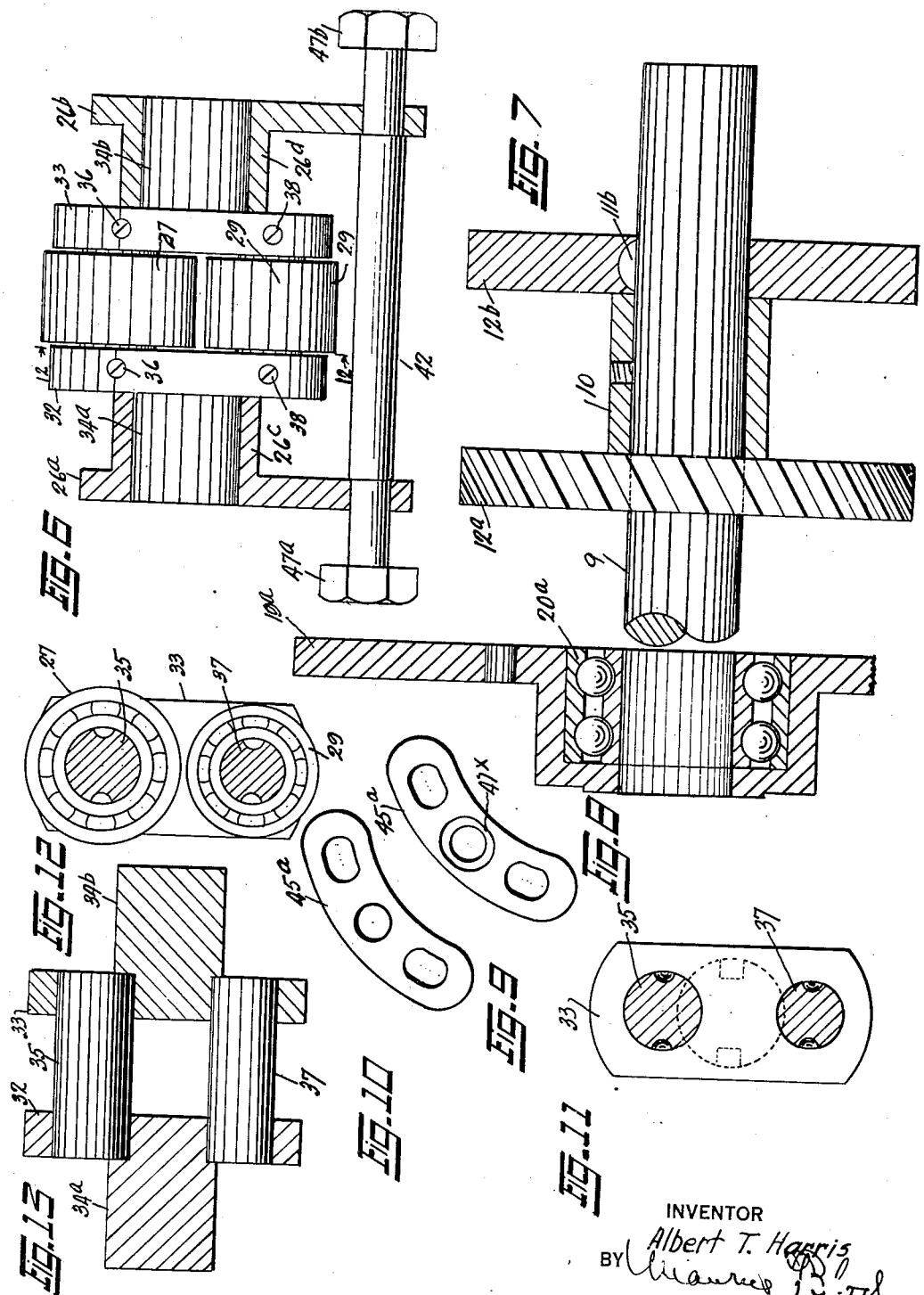

2,084,843

UNITED STATES PATENT OFFICE 2,084,843

POWER TRANSMISSION DEVICE

Albert T. Harris, New York, N. Y., assignor to A. T. Harris Holding Corporation, New York, N. Y., a corporation of New York Application November 22, 1934, Serial No. 754,277

8 Claims. (Cl. 74—305)

This invention relates to power transmission and torque increasing devices adapted to be used in conjunction with various kinds of power plants, such transmission devices being placed between the driving and driven members. Power is applied to a shaft of the transmission device and transferred from the said shaft by means of one or more sun gears to planetary gears, rollers, levers and web plates to a driven or delivery shaft which may be coupled to the machine or device to be driven.

One object of the invention is to produce a device of this character that will deliver a torque in excess of that delivered by transmission devices now in use.

A further object of the invention is to produce such a device that will minimize the jar when starting the device.

A still further object of the invention is to produce a device of the character referred to that may be readily assembled and disassembled, also easy to service or replace parts therein.

Still another object of the invention is to produce a device of this nature which is adapted to run forwardly or backwardly.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

In the accompanying drawings,

Figure 1 is a longitudinal sectional view through the device.

Figure 2 is a sectional view taken on line 2—2 Figure 1 with a portion of the web plate broken away.

Figure 3 is a sectional view taken approximately on line 3—3, Figure 1.

Figure 4 is a longitudinal sectional view through one of the planetary gears.

Figure 5 is a detailed view of one of the driving pin push arms.

Figure 6 is a sectional view of the power take-off means which is enclosed within the planetary gears.

Figure 7 is a fragmental view partly in elevation and partly in section of the sun gear assembly.

Figure 8 is a fragmental sectional view through one of the web plates.

Figure 9 is a rear view of the driving pin adjustment block.

Figure 10 is a front view thereof.

Figure 11 is an end view partly in section of the power take-off unit with certain parts omitted.

Figure 12 is a sectional view taken on line 12—12, Figure 6, and

Figure 13 is a sectional view taken through the center of Figure 12 with the rollers omitted.

Referring now to the drawings in detail 9 indicates a shaft adapted to be driven by or from any power producing plant or mechanism not shown. The said shaft 9 is supported at one end thereof in a bearing 13a secured by means of screws 14a to an end wall 15a of a drum or housing 16. Secured to the shaft 9 intermediate its ends is a pair of spirally cut sun gears 12a and 12b and separated by a spacing sleeve or block 10. The gear 12a is secured to the shaft 9 by a key 11a and the gear 12b is similarly secured by a key 11b. The drum or casing 16 is provided with inner or centering plates 17a and 17b, the plate 17a being alongside the wall 15a and the plate 17b being at the opposite end of the drum and alongside the wall 15b. The plate 17a has a central ball bearing 18a through which the shaft 9 passes and the plate 17b has a ball bearing 18b through which the delivery shaft 52 passes, the said delivery shaft also being journalled in a bearing 13a secured to the wall 15b by means of screws 14b.

In mesh with the teeth of the sun gear 12a are the teeth of planetary gears 20a, the said gear being in the form of shells 20d having an outer threaded portion 20 upon which there is threaded the innerly threaded portion 20x of planetary gear shells 20b (Fig. 4), the teeth of which are in mesh with the teeth of the sun gear 12b. The teeth of the planetary gears 20a and 20b are in mesh respectively with the teeth of ring gears 21a and 21b. The toothed portions of the said ring gears are connected together by a central frame 21c which is secured to the shell or drum 16.

Ball bearings A and B are provided on the shaft 9 upon which bearings there are respectively mounted web plates 19a and 19b, between which plates there is provided in each planetary gear unit a power take-off or forwarding unit. Each of the said power take-off units comprises a ball bearing roller 27 mounted on a pin 35 which extends into plates 32 and 33 and to which it is secured by screws 36. A second pin 37 extends into the said plates 32 and 33 and is secured in place by screws 38. The said pin 37 supports a second ball bearing roller 29 which is smaller in diameter than the roller 27. The plates 32 and 33 and pins 35 and 37 are further held together by screws 39 and 39a. The rollers 27 and 29 operate in an inner central annular groove 28 cut in the planetary gear shell 20a. Extending from the plate 32 is a cylindrical shaft-like extension 34a and extending from the plate 33 is a similar extension 34b. Secured on to the extension 34a by means of a key and keyway arrangement 40 and 41 is a push arm 26a which is provided with a hub 26c which extends into the gear 20a through a hub 24a thereon. Similarly secured to the extension 34b is a push arm 26b having a hub 26d, which enters the inner bore of a hub 24b on the planetary gear section 20b.

A plate 22a having outer ball bearings 23a is provided at the left of the ring gear structure and a similar plate 22b having outer ball bearing 23b is provided at the right of the said ring gear structure. Each of the said plates is respectively provided with ball bearings 49a and 49b upon which they revolve around the shaft 9. The ball bearings 23a and 23b are provided respectively for the hubs 24a and 24b of the planetary gear sections 20a and 20b. The said ball bearings 23a and 23b are maintained in place by spacing collars 25a and 25b secured respectively to the hubs 24a and 24b.

The web plates 19a and 19b as well as each pair of push arms 26a and 26b are connected together by means of a rod 42 which passes through the said arms and plates and through arcuate adjustment blocks 45a and 45b, and held in place by nuts 47a and 47b. The said blocks 45a and 45b are each provided with an extension or boss 47x which extends into a depression, recess or cut-out portion 47y in the web plates 19a and 19b, the length of the said bosses being somewhat shorter than the length of the depressions 47y to permit adjustment. Bolts 46a and 46b respectively secure the blocks 45a and 45b to their respective web plates. The aforementioned adjustment is provided so as to bring the rollers 27 and 29 in proper contact with the annular grooves 28. Spacing or filler blocks 47c are placed between the web plates 19a and 19b and are secured in place by bolts 47d.

The bearing B is closed by an end plate 48 (see Fig. 1) and has secured thereto a disk 49 by means of bolts or screws 50. Keyed to the said disk by means of a key 51 is the delivery shaft 52 which passes through the ball bearing 18B and bearing 13a.

The operation of the device is as follows:

Power is applied to the drive shaft 9 and forwarded by means of the sun gears 12a and 12b to the planetary gears 20a and 20b which are in mesh with the said sun gears and with the ring gears 21a and 21b. This arrangement causes the planetary gears to rotate in the same direction as the drive shaft 9. Due to the contact of the ball bearing rollers 27 with the interior or groove 28 of the planetary gears, power and motion will be imparted to the said rollers and transferred through the parts 32, 33, 34a, 34b, 26a, 26b, 42, 19a, 19b to the delivery shaft 52.

On the reversal of the rotation of the device, the roller 29 will transfer power and motion to the aforementioned parts.

From the foregoing, it will be seen that I have provided a highly efficient yet simple power transmission and torque increasing device, adapted to be used wherever power is to be used or generated.

It will also be seen that due to the central location of the rollers 27 and 29 with respect to the planetary gears, highly efficient operation between the said gears and ring gears is obtained.

Having described my invention, what I claim as new and desire to secure by Letters Patent is:

1. A device of the nature described, comprising a power shaft, a driven shaft, and a unit driven by the power shaft, the said unit including a pair of spaced apart sun gears on the power shaft, a carrier connected to the driven shaft, a planet gear unit driven by the sun gears, the said planet gear unit being provided with an inner annular centrally located groove from which power may be taken off, and a roller operatively associated with the said groove and eccentrically located relative thereto and connected to the said carrier for transmitting power to the driven shaft.

2. A device of the nature described, comprising a power shaft, a driven shaft, and a unit driven by the power shaft, the said unit including a pair of spaced apart sun gears on the power shaft, a carrier connected to the driven shaft, a planet gear unit driven by the sun gears, the said planet gear unit being provided with an inner annular centrally located groove from which power may be taken off, a roller operatively associated with the said groove eccentrically located relative thereto and connected to the said carrier for transmitting power to the driven shaft, and means for adjusting the said roller with respect to the annular groove.

3. A device of the nature described, comprising a power shaft, a unit driven by the said power shaft, the said unit including a pair of spaced apart sun gears on the shaft, a pair of stationary ring gears, connected planetary gear shells driven by the sun gears and in mesh with the ring gears, the said planetary gear shells having an inner annular power take-off surface, a power take-off unit, a roller on the said unit in operative engagement with the power take-off surface and located eccentrically relative thereto, web plates, means for connecting the power take-off unit to the web plates, and a shaft driven by the said web plates, said means comprising a pair of push arms between which the roller is mounted, a connector connecting the push arms to the web plates.

4. A device of the nature described, comprising a power shaft, a driven shaft, and a unit driven by the power shaft, the said unit including a sun gear on the power shaft, a carrier connected to the driven shaft, a planet gear unit driven by the sun gear, the said planet gear unit being provided with a centrally located annular surface beyond its axis from which power may be taken off at any point in its inner periphery, and means operatively engaged with said surface eccentrically located relative thereto and connected to the said carrier for transmitting power to the driven shaft.

5. A device of the class described, comprising a power shaft, a driven shaft, a sun gear fixed on the power shaft, a planetary gear unit operable by said sun gear, interconnected web plates on opposite sides of the planetary gear unit and operatively connected to the driven shaft, said planetary gear unit being provided with internal centrally located means therein from which power may be taken off at any point in its inner periphery, instrumentalities operatively engaged with said means eccentrically located relative thereto, and push arm elements operatively connecting the instrumentalities with the web plates for transmitting power to the driven shaft.

6. A device of the class described, comprising a power shaft, a driven shaft, a sun gear fixed on the drive shaft, a planetary gear unit driven by the sun gear, interconnected web plates on opposite sides of the planetary gear unit, and operatively connected to the driven shaft, said planetary gear unit being provided with an inner annular centrally located groove from which power may be taken off at any point in its inner periphery, a member operatively engaged with said annular groove eccentrically located relative thereto, and push arm means operatively connecting the member with the web plates for transmitting power to the driven shaft.

7. A device of the nature described, comprising a power shaft, a driven shaft, and a unit driven by the power shaft, the said unit including a pair of spaced apart sun gears on the power shaft, a carrier connected to the driven shaft, a planet gear unit driven by the sun gears, the said planet gear unit being provided with an inner annular groove from which power may be taken off, a pair of push arms connected to the carrier, means connected to the push arms, and a pair of rollers carried by the said means in operative association with the annular groove and eccentrically located relative thereto, one of the said rollers being larger in diameter than the other.

8. A device of the nature described, comprising a power shaft, a driven shaft, and a unit driven by the power shaft, the said unit including a pair of spaced apart sun gears on the power shaft, a carrier connected to the driven shaft; a planet gear unit driven by the sun gears, the said planet gear unit comprising a shell having gear teeth on the outer periphery thereof, a second toothed shell fitting into the first mentioned shell and being provided with an inner annular groove from which power may be taken off, and a roller operatively associated with the groove eccentrically located relative thereto and connected to the said carrier for transmitting power to the driven shaft.

ALBERT T. HARRIS.